United States Patent
Jain et al.

(10) Patent No.: US 12,283,103 B2
(45) Date of Patent: Apr. 22, 2025

(54) VIDEO CAMERA FOR LOCALLY EXECUTING A PLURALITY OF VIDEO ANALYTIC ALGORITHMS ON A VIDEO STREAM CAPTURED BY THE VIDEO CAMERA

(71) Applicant: Honeywell International Inc., Charlotte, NC (US)

(72) Inventors: Abhisekh Jain, Madurai (IN); Sivasanthanam Dhayalan, Bangalore (IN); Jeslin Paul Joseph, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 79 days.

(21) Appl. No.: 18/072,131

(22) Filed: Nov. 30, 2022

(65) Prior Publication Data

US 2024/0037946 A1     Feb. 1, 2024

(30) Foreign Application Priority Data

Aug. 1, 2022   (IN) .............................. 202211043913

(51) Int. Cl.
  *H04N 5/235*     (2006.01)
  *G06V 10/94*     (2022.01)
  (Continued)

(52) U.S. Cl.
  CPC .............. *G06V 20/44* (2022.01); *G06V 10/95* (2022.01); *G06V 20/52* (2022.01)

(58) Field of Classification Search
  CPC ........ G06V 20/44; G06V 20/52; G06V 10/95; H04N 7/18; H04N 5/235
  (Continued)

(56) References Cited

U.S. PATENT DOCUMENTS 8,325,228 B2 * 12/2012 Mariadoss ........... H04N 21/478
                                          348/143
9,325,951 B2 *  4/2016 Saptharishi ...... H04N 21/44008
(Continued)

FOREIGN PATENT DOCUMENTS

CN    106503632 A    3/2017
CN    112351262 A    2/2021

OTHER PUBLICATIONS

Shu et al; "An eight-camera fall detection system using human fall pattern recognition via machine learning by a low-cost android box," Scientific Reports, vol. 11, 2471, 17 pages, 2021.
(Continued)

*Primary Examiner* — Trang U Tran
(74) *Attorney, Agent, or Firm* — Seager, Tufte & Wickhem, LLP

(57) ABSTRACT

A video camera includes a camera for capturing a video stream and a controller that is operably coupled to the camera. The controller, which includes processing resources, is configured to determine a current utilization of one or more of the processing resources and to determine which of a plurality of video analytics algorithms should be executed based at least in part on the determined current utilization of the one or more processing resources. The controller is configured to execute two or more of the plurality of video analytics algorithms on the video stream to identify one or more events in the video stream, wherein the controller executes the two or more of the plurality of video analytics algorithms, and sends an alert in response to identifying one or more events in the video stream.

14 Claims, 9 Drawing Sheets

(51) Int. Cl.
*G06V 20/40* (2022.01)
*G06V 20/52* (2022.01)

(58) Field of Classification Search
USPC .......................................................... 348/143
See application file for complete search history.

(56) References Cited

U.S. PATENT DOCUMENTS

| | | | |
|---|---|---|---|
| 9,679,196 B2* | 6/2017 | Shima | G06V 20/56 |
| 10,212,397 B2 | 2/2019 | Zhang | |
| 10,223,604 B2 | 3/2019 | Bahl et al. | |
| 10,530,990 B2* | 1/2020 | Sevin | H04N 23/62 |
| 2016/0012282 A1 | 1/2016 | Shima et al. | |

OTHER PUBLICATIONS

Google News, https://www.intenseye.com/, 1 page, Accessed May 27, 2022.
Zaheer et al; "A Preliminary Study on Deep-Learning Based Screaming Sound Detection," A Conference Paper, 5 pages, Aug. 2015.
Extended European Search Report, EP Application No. 23188895.9, European Patent Office, Dec. 4, 2023 (7 pages).

* cited by examiner

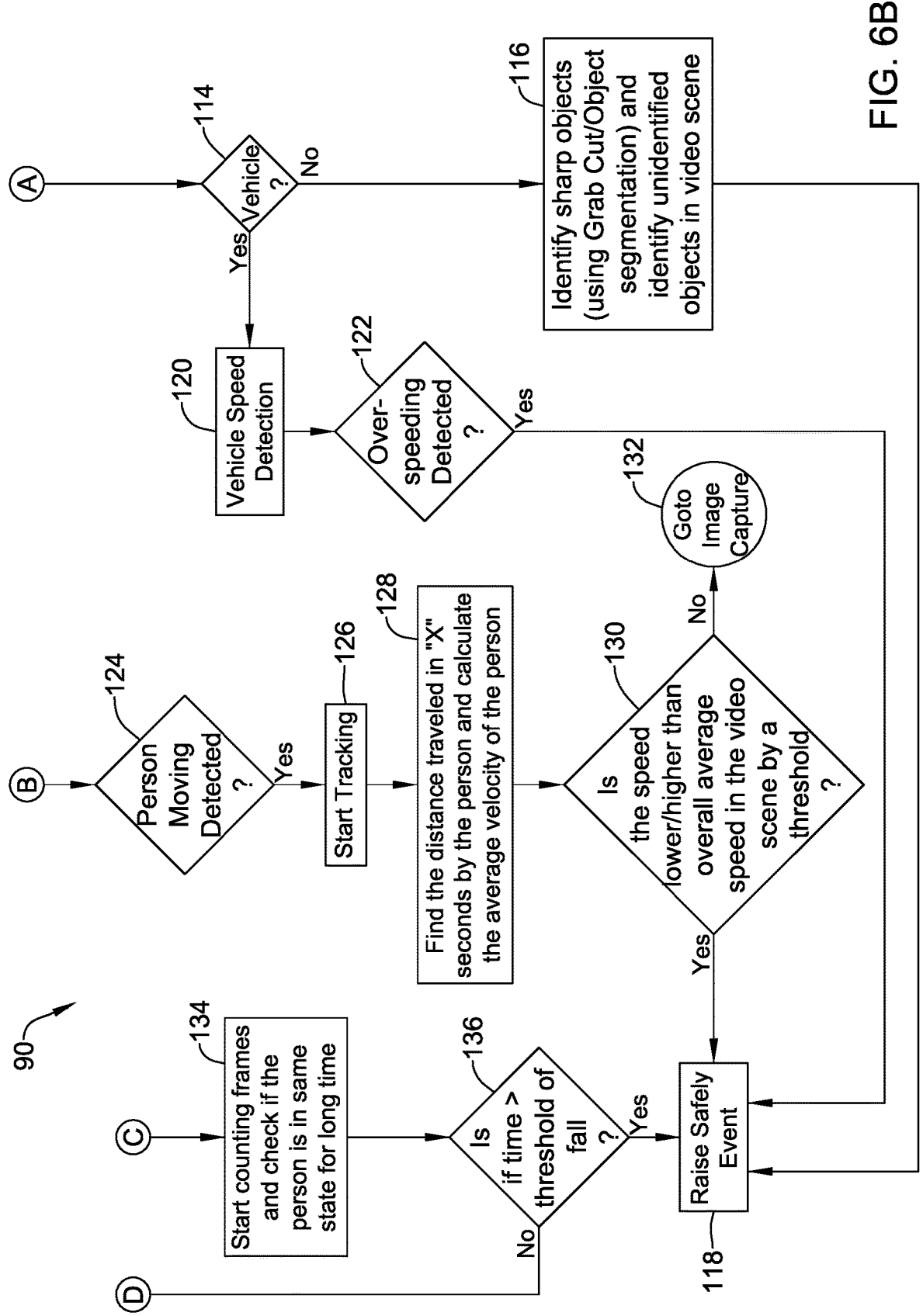

VIDEO CAMERA FOR LOCALLY EXECUTING A PLURALITY OF VIDEO ANALYTIC ALGORITHMS ON A VIDEO STREAM CAPTURED BY THE VIDEO CAMERA

CROSS-REFERENCE TO RELATED APPLICATIONS

This application claims priority pursuant to 35 U.S.C. 119(a) to India Patent Application No. 202211043913, filed Aug. 1, 2022, which application is incorporated herein by reference in its entirety.

TECHNICAL FIELD

The present disclosure relates to video cameras, and more particularly, to video cameras that are configured to execute video analytic algorithms.

BACKGROUND

Video cameras are utilized in a variety of video surveillance systems for monitoring monitored areas such as a building or part of a building, part of a parking structure, a street scene, and the like. Some video cameras are part of centralized video surveillance systems that centralize video analytics, such as at a central server. Some video cameras are part of decentralized video surveillance systems that decentralize at least some of the video analytics. In a decentralized video surveillance system, one or more of the video cameras may be configured to execute one or more video analytics algorithms. However, video cameras have limited processing resources, and these limited processing resources are used to support basic video camera operations, such as streaming captured video to an external device, storing all or part of the captured video to a local memory, compressing, formatting and/or encrypting all or part of the video stream prior to streaming and/or storing the captured video, controlling a pan/tilt/zoom state of the video camera, downloading and installing updated firmware and/or applications software on the video camera, running diagnostics on the video camera hardware and/or other basic video camera operations. The remaining processing resources that are available to support non-basic operations such as video analytics will tend to vary over time depending on the current operating state of the video camera. What would be desirable is a video camera that is configured to dynamically execute one or more video analytic algorithms depending on the processing resources of the video camera that are currently available to support video analytics.

SUMMARY

This disclosure relates to video cameras, and more particularly, to video cameras that are configured to execute video analytic algorithms. An example may be found in a video camera that includes a camera for capturing a video stream and a controller that is operably coupled to the camera. The controller, which includes processing resources, is configured to determine a current utilization of one or more of the processing resources and to determine a priority of execution for each of a plurality of video analytics algorithms based at least in part on the determined current utilization of the one or more processing resources. The controller is configured to execute two or more of the plurality of video analytics algorithms on the video stream to identify one or more events in the video stream, wherein the controller executes the two or more of the plurality of video analytics algorithms in accordance with the determined priority of execution, and sends an alert in response to identifying one or more events in the video stream.

Another example may be found in a video camera that includes a camera for capturing a video stream and a controller that is operably coupled to the camera, the controller including processing resources. The controller is configured to store two or more versions of a first video analytics algorithm including a heavier weight version of the first video analytics algorithm and a lighter weight version of the first video analytics algorithm, and to determine a current utilization of one or more of the processing resources of the controller. The controller is configured to select either the heavier weight version of the first video analytics algorithm or the lighter weight version of the first video analytics algorithm based at least in part on the determined current utilization of the one or more processing resources, and to execute the selected version of the first video analytics algorithm to identify one or more first events in the video stream. In this example, the controller is configured to send an alert in response to identifying one or more first events in the video stream.

Another example may be found in a method of operating a video camera. The illustrative method includes the video camera determining a current utilization of one or more processing resources of the video camera. The video camera determines a priority of execution for each of a plurality of locally stored video analytics algorithms based at least in part on the determined current utilization of the one or more processing resources of the video camera. The video camera executes two or more of the plurality of locally stored video analytics algorithms in accordance with the determined priority of execution on a video stream captured by the video camera to identify one or more events in the video stream. In this example, the video camera sends an alert in response to identifying one or more events in the video stream.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIGS. 4A and 5B are flow diagrams that together show an illustrative set of steps that a controller forming part of the illustrative video surveillance system of FIG. 1 may be configured to carry out;

FIGS. 6A and 6B are flow diagrams that together show an illustrative method.

Figure 1:
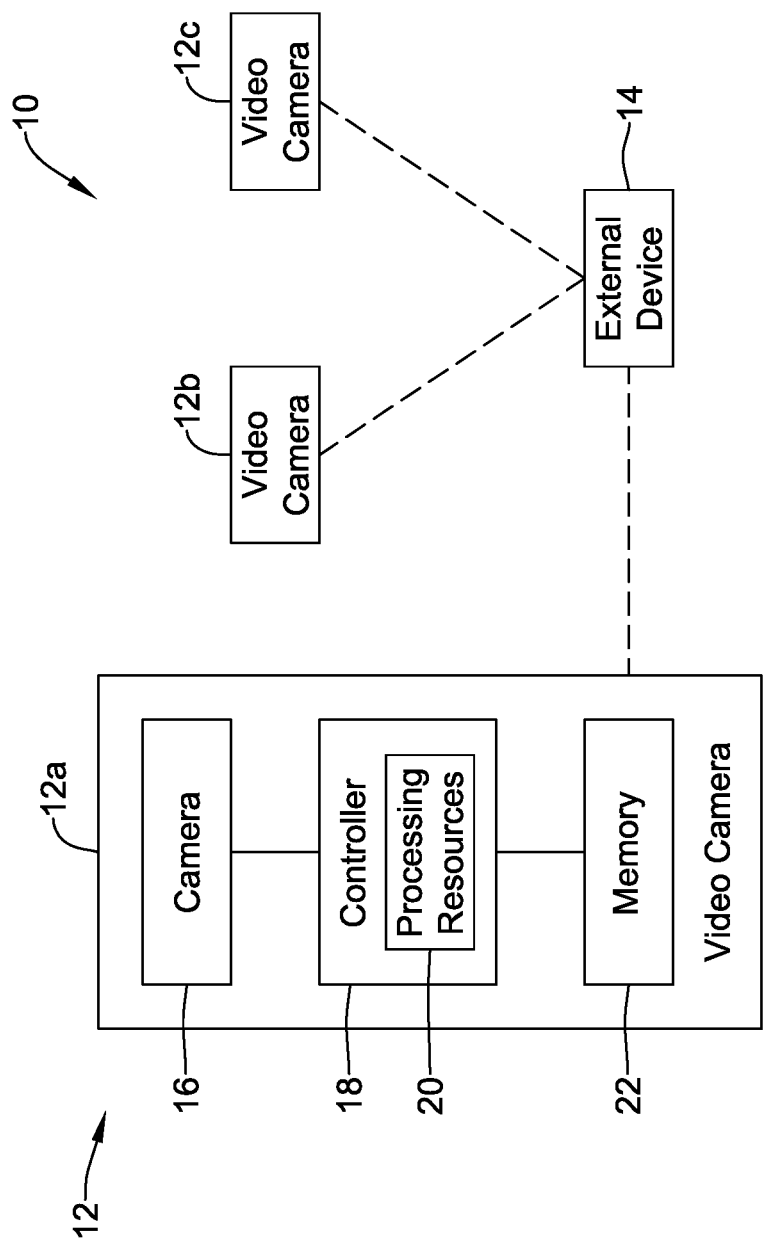
FIG. 1 is a schematic block diagram of an illustrative video surveillance system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative video surveillance system 10. The illustrative video surveillance system 10 includes a number of video cameras 12, individually labeled as 12a, 12b and 12c. While a total of three video cameras 12 are shown, it will be appreciated that this is merely illustrative, as the video surveillance system 10 may include any number of video cameras 12, and in some instances may include a large number of video cameras 12. In some instances, one or more of the video cameras 12 may be operably coupled with an external device 14. The video cameras 12 may communicate with the external device 14 in a wired or wireless fashion. The external device 14 may be part of a monitoring station. The external device 14 may be a computer that is configured to receive video streams from one or more of the video cameras 12 and perform video analytics on the video streams. In some cases, the external device 14 may include a video recorder.

The video camera 12a is shown as including internal components. While these internal components are only drawn with respect to the video camera 12, it will be appreciated that the other video cameras 12, such as the video camera 12b and the video camera 12c, may also include these same components. In the example shown, the video camera 12a includes a camera 16 for capturing a video stream. The camera 16 may be a fixed field of view (FOV) video camera, for example, or perhaps a PTZ (Pan-Tilt-Zoom) camera that has an adjustable FOV. The camera 16 is operatively coupled with a controller 18. The controller 18 includes processing resources 20. The processing resources 20 may include one or more of CPU processing capability, GPU processing capability, memory and/or Input/Output (I/O) bandwidth, for example.

The video camera 12a may include a memory 22 that is operably coupled with the controller 18. In some instances, the memory 22 may be configured to store video clips and/or video streams. In some cases, the memory 22 may be configured to store a plurality of video analytics algorithms. The video analytics algorithms storable in the memory 22 may include various different video analytics algorithm. In some cases, the video analytics algorithms storable in the memory 22 may include multiple versions of the same video analytics algorithm, such as a lightweight version that requires relatively less of the processing resources 20 and a heavyweight version that requires relatively more of the processing resources 20. The lightweight version may have fewer features, or perhaps lower resolution while the heavyweight version may have more features, or perhaps greater resolution. For example, a heavyweight version of a video analytics algorithm may be an Artificial Intelligence (AI) object classification video analytics algorithm that is trained to identify and classify 30 different object types, where a lightweight version of a video analytics algorithm may be trained to classify only 10 different object types. The lightweight version of a video analytics algorithm may include fewer convolution layers, and may consume significantly less CPU cycles and memory.

The video analytics algorithms can include any suitable video analytics algorithm including, for example, que analytics algorithms for monitoring a que of people or objects in the video stream, crowd analytics algorithms for monitoring characteristics of a crowd in the video stream, people identifying analytics algorithms for identifying people in the video stream, people behavior analytics algorithms for monitoring behavior of people in the video stream, fall analytics algorithms for monitoring falls of people in the video stream, and object analytics algorithms for identifying and classifying objects in the video stream. These are just example video analytics algorithms, and it is contemplated that any suitable video analytics module may be used.

The processing resources 20 of the controller 18 are used to control the basic operations of the controller 18 (i.e. operations other than execution of the video analytics algorithms). Such basic operations of the video camera can include, for example, streaming the video stream to the external device 14, recording the video stream to a local removable non-volatile memory such as the memory 22, controlling a Pan, Tilt and/or Zoom (PTX) operation of the video camera 12, compressing, formatting and/or encrypting all or part of the video stream, downloading and installing updated firmware and/or applications software on the video camera, running diagnostics on the video camera, and servicing one or more web requests from one or more Application Programming Interfaces (API) and streaming the video stream to one or more web clients. These are just examples.

The processing resources 20 of the controller 18 that are currently available to execute video analytics algorithms may vary with time, depending on what else the controller 18 is doing. For example, if the controller 18 is currently receiving software updates, its remaining processing capabilities (e.g. remaining CPU cycles, remaining GPU cycles, remaining memory and/or remaining bandwidth) may be reduced. If the controller 18 is uploading video clips to the external device 14, for example, its remaining processing capabilities may be reduced. The processing resources 20 that are not necessary to support the basic operation of the video camera may be used to support video analytics. In some cases, the video analytics are only run during times when there are extra processing resources 20 that are not necessary to support the basic operation of the video camera, such that the video analytics processing does not interfere with the basic operations of the video camera.

Figure 2:
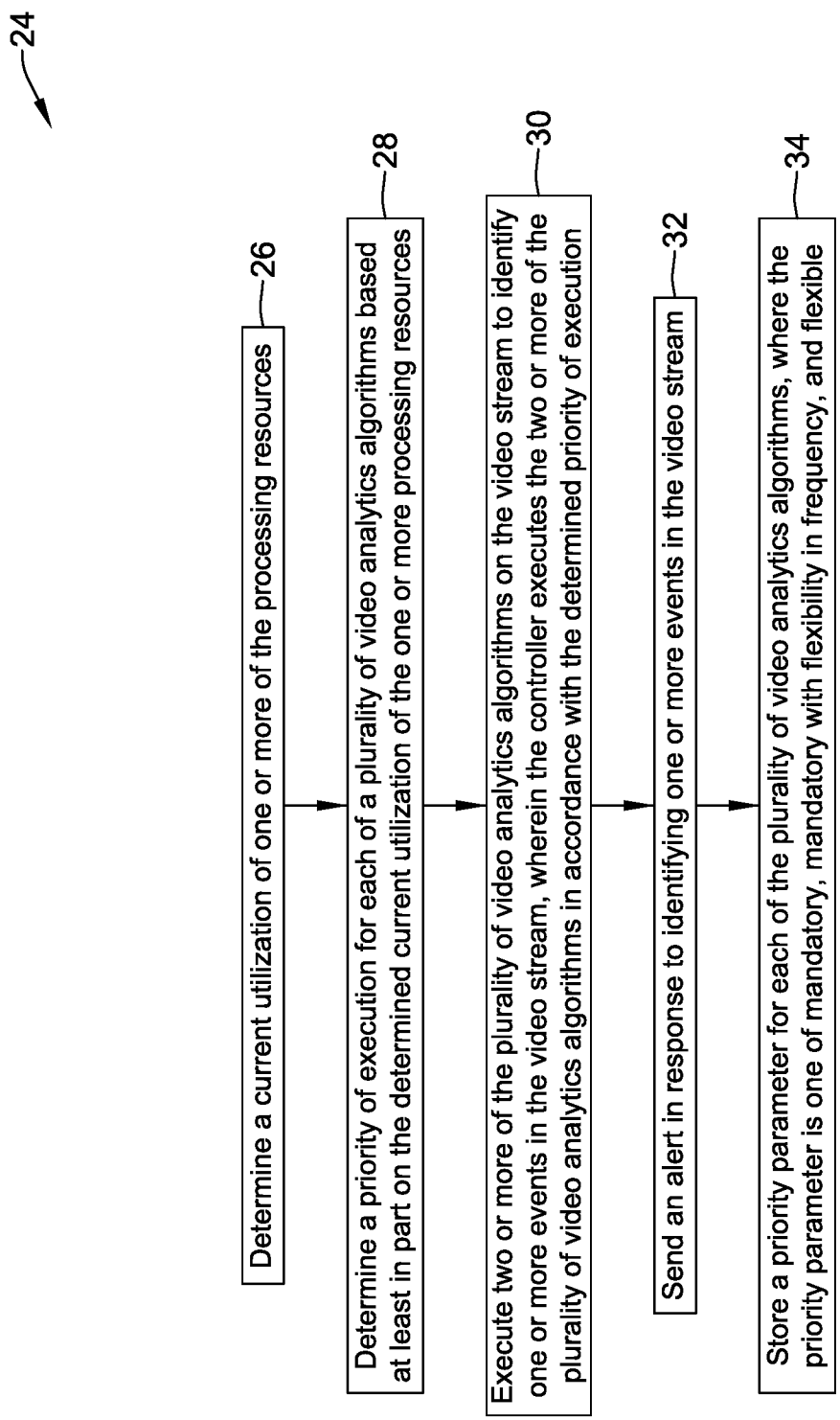
FIG. 2 is a flow diagram showing an illustrative set of steps that a controller forming part of the illustrative video surveillance system of FIG. 1 may be configured to carry out.

FIG. 2 is a flow diagram showing an illustrative sequence of steps 24 that the controller 18 (within any of the video cameras 12) may be configured to carry out. The controller 18 is configured to determine a current utilization of one or more of the processing resources 20, as indicated at block 26. In some cases, the current utilization of one or more of the processing resources 20 may be determined when no video analytics algorithms are running on the video camera. In some cases, the current utilization of one or more of the processing resources 20 may be determined when one or more video analytics (e.g. mandatory video analytics algorithms) are already running on the video camera. The controller 18 is configured to determine a priority of execution for each of a plurality of video analytics algorithms based at least in part on the determined current utilization of the one or more processing resources 20, as indicated at block 28. The controller 18 is configured to execute two or more of the plurality of video analytics algorithms on the video stream to identify one or more events in the video stream, wherein the controller 18 executes the two or more of the plurality of video analytics algorithms in accordance with the determined priority of execution. In some cases, the controller 18 is configured to send an alert in response to identifying one or more events in the video stream.

In some cases, a first one of the plurality of video analytics algorithms has a higher priority than a second one of the plurality of video analytics algorithms, and the priority of execution may include executing the first one of the plurality of video analytics algorithms more often than the second one of the plurality of video analytics algorithms. In some cases, a first one of the plurality of video analytics algorithms has a higher priority than a second one of the plurality of video analytics algorithms, and the priority of execution may include executing the first one of the plurality of video analytics algorithms and not executing the second one of the plurality of video analytics algorithms. A third one of the plurality of video analytics algorithms may be a lighter weight version of the second one of the plurality of video analytics algorithms, and wherein the priority of execution may include executing the third one of the plurality of video analytics algorithms in place of the second one of the plurality of video analytics algorithms.

In some cases, the plurality of video analytics algorithms may include two video analytics algorithms that identify different event types in the video stream. The plurality of video analytics algorithms may include two video analytics algorithms that identify a common event type in the video stream, wherein one of the two video analytics algorithms identifies the common event type with more granularity (thus requiring more processing resources 20) than the other of the two video analytics algorithms that identify the common event type. The plurality of video analytics algorithms may include two video analytics algorithms that identify a common event type in the video stream, wherein one of the two video analytics algorithms identifies the common event type with more accuracy (thus requiring more processing resources 20) than the other of the two video analytics algorithms that identify the common event type.

In some cases, the controller 18 may be configured to store a priority parameter for each of the plurality of video analytics algorithms, where the priority parameter is one of mandatory, mandatory with flexibility in frequency, or flexible, as indicated at block 34. In some instances, video analytics algorithms having a priority parameter of mandatory must be executed. Video analytics algorithms having a priority parameter of mandatory with flexibility in frequency must be executed but can be executed at a reduced frequency. Video analytics algorithms having a priority parameter of flexible need not be run but should be run if sufficient processing resources are currently available. In some cases, the priority parameter for each of the plurality of video analytics algorithms may be stored in a user programmable template.

Figure 3A:
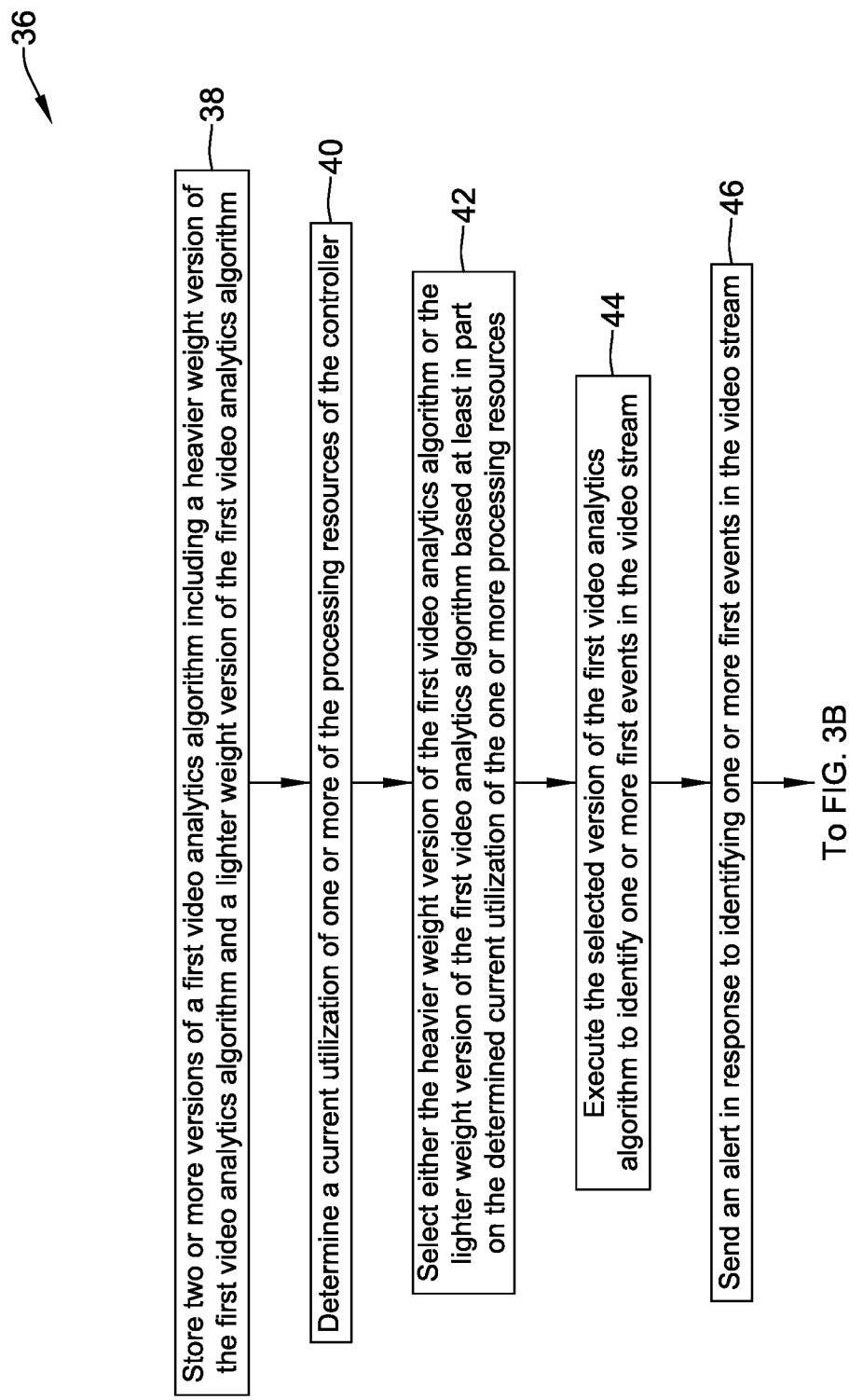
FIGS. 3A and 3B are flow diagrams that together show an illustrative set of steps that a controller forming part of the illustrative video surveillance system of FIG. 1 may be configured to carry out.
Figure 3B:
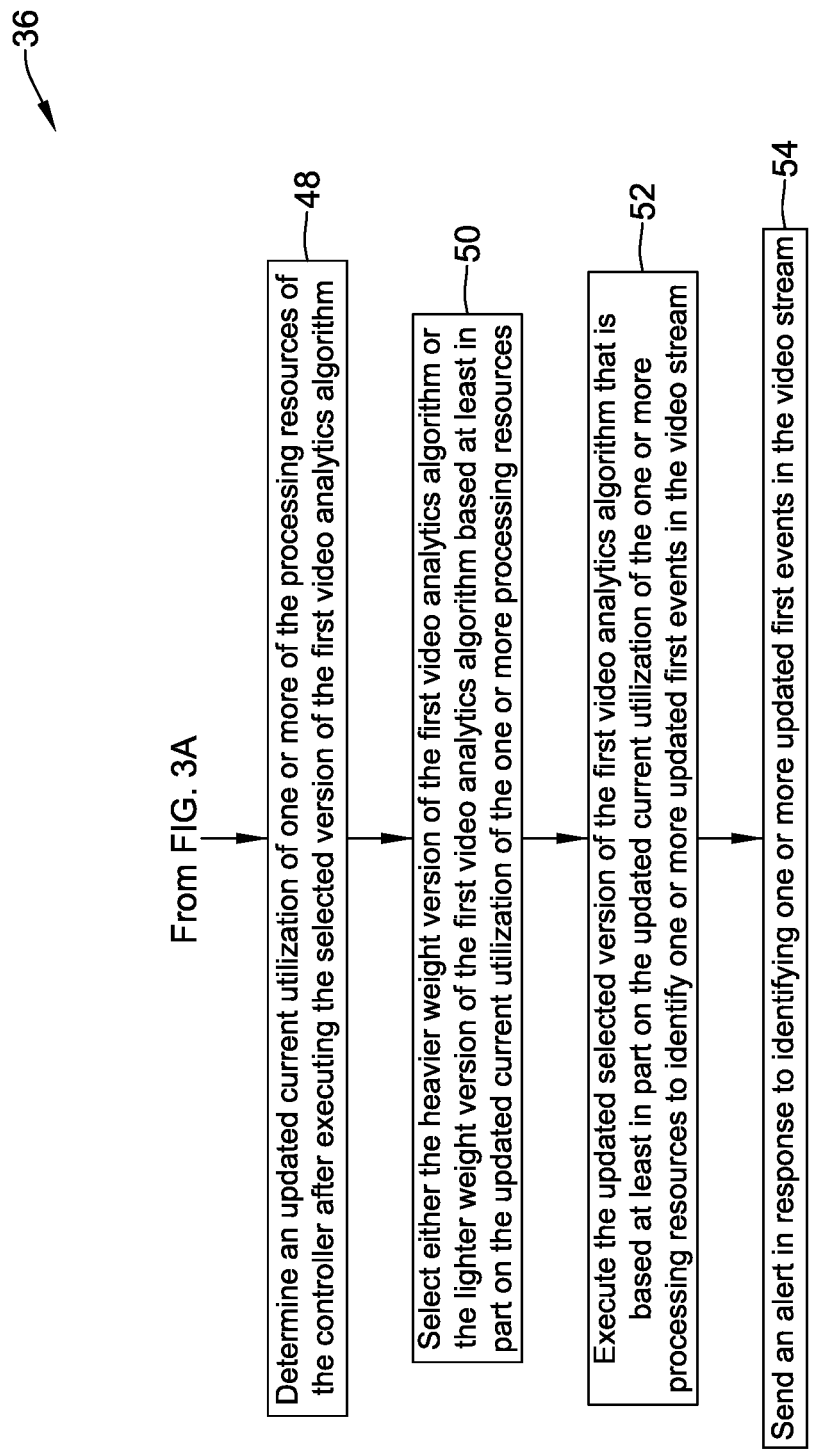

FIGS. 3A and 3B are flow diagrams that together show an illustrative sequence of steps 36 that the controller 18 (within any of the video cameras 12) may be configured to carry out. The controller 18 is configured to store two or more versions of a first video analytics algorithm including a heavier weight version of the first video analytics algorithm and a lighter weight version of the first video analytics algorithm, as indicated at block 38. In some cases, the heavier weight version of the first video analytics algorithm may consume more of the processing resources 20 of the controller 18 than the lighter weight version of the first video analytics algorithm.

The controller 18 is configured to determine a current utilization of one or more of the processing resources of the controller, as indicated at block 40. The controller 18 is configured to select either the heavier weight version of the first video analytics algorithm or the lighter weight version of the first video analytics algorithm based at least in part on the determined current utilization of the one or more processing resources, as indicated at block 42. For example, the controller 18 may select the heavier weight version of the first video analytics algorithm when the determined current utilization of the one or more processing resources is lower, while the controller 18 may select the lighter weight version of the first video analytics algorithm when the determined current utilization of the one or more processing resources is higher. The controller 18 is configured to execute the selected version of the first video analytics algorithm to identify one or more first events in the video stream, as indicated at block 44. In the example shown, the controller 18 is configured to send an alert in response to identifying one or more first events in the video stream, as indicated at block 46.

In some cases, and continuing on FIG. 3B, the controller 18 may be configured to determine an updated current utilization of one or more of the processing resources of the controller after executing the selected version of the first video analytics algorithm, as indicated at block 48. The controller 18 may be configured to select either the heavier weight version of the first video analytics algorithm or the lighter weight version of the first video analytics algorithm based at least in part on the updated current utilization of the one or more processing resources 20, as indicated at block 50. The controller 18 may be adapted to execute the updated selected version of the first video analytics algorithm that is based at least in part on the updated current utilization of the one or more processing resources 20 to identify one or more updated first events in the video stream, as indicated at block 52. The controller 18 may be adapted to send an alert in response to identifying one or more updated first events in the video stream, as indicated at block 54.

Figure 4A:
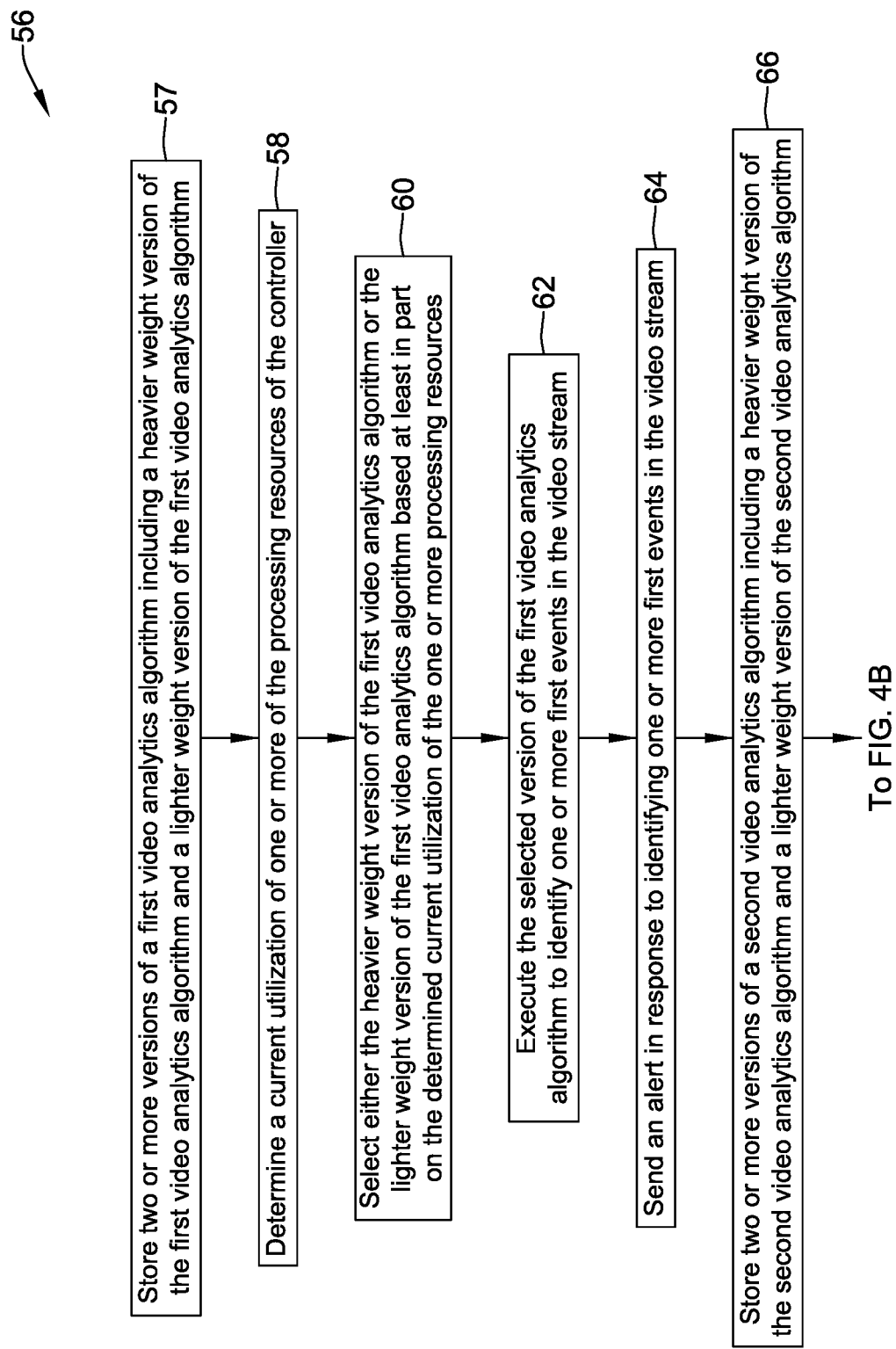
Figure 4B:
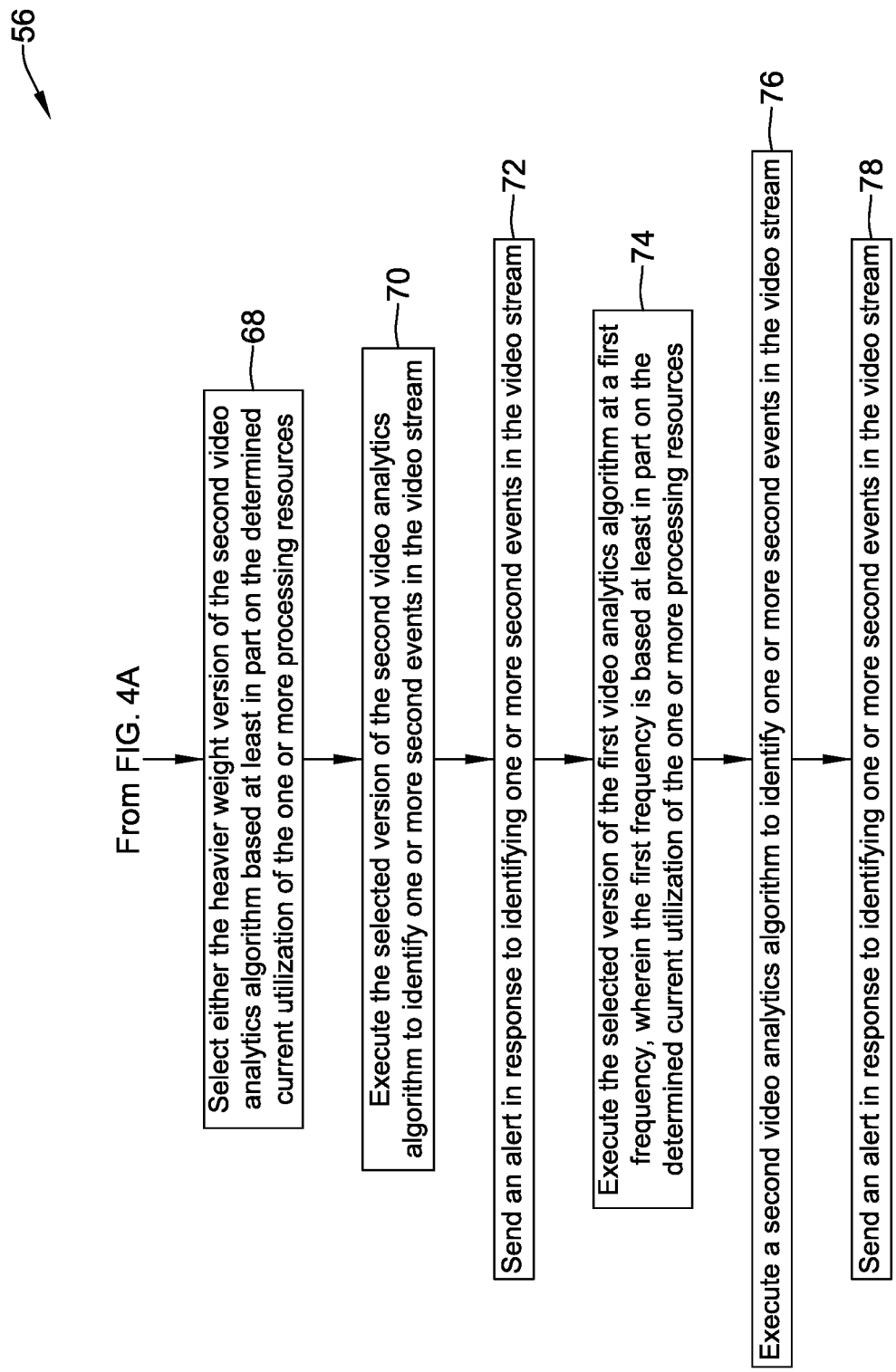

FIGS. 4A and 4B are flow diagrams that together show an illustrative sequence of steps 56 that the controller 18 (within any of the video cameras 12) may be configured to carry out. The controller 18 is configured to store two or more versions of a first video analytics algorithm including a heavier weight version of the first video analytics algorithm and a lighter weight version of the first video analytics algorithm, as indicated at block 57. In some cases, the heavier weight version of the first video analytics algorithm may consume more of the processing resources 20 of the controller 18 than the lighter weight version of the first video analytics algorithm.

The controller 18 is configured to determine a current utilization of one or more of the processing resources of the controller, as indicated at block 58. The controller 18 is configured to select either the heavier weight version of the first video analytics algorithm or the lighter weight version of the first video analytics algorithm based at least in part on the determined current utilization of the one or more processing resources, as indicated at block 60. The controller 18 is configured to execute the selected version of the first video analytics algorithm to identify one or more first events in the video stream, as indicated at block 62. The controller 18 is configured to send an alert in response to identifying one or more first events in the video stream, as indicated at block 64. The controller 18 may be configured to store two or more versions of a second video analytics algorithm including a heavier weight version of the second video analytics algorithm and a lighter weight version of the second video analytics algorithm, as indicated at block 66.

In some cases, and continuing on FIG. 4B, the controller 18 may be configured to select either the heavier weight version of the second video analytics algorithm or the lighter weight version of the second video analytics algorithm based at least in part on the determined current utilization of the one or more processing resources 20, as indicated at block 68. The controller 18 may be configured to execute the selected version of the second video analytics algorithm to identify one or more second events in the video stream, as indicated at block 70. The controller 18 may be configured to send an alert in response to identifying one or more second events in the video stream, as indicated at block 72.

In some cases, the controller 18 may be configured to execute the selected version of the first video analytics algorithm at a first frequency, wherein the first frequency is based at least in part on the determined current utilization of the one or more processing resources, as indicated at block 74. The controller 18 may be configured to execute a second video analytics algorithm to identify one or more second events in the video stream, as indicated at block 76. In some cases, the controller 18 may be configured to execute the second video analytics algorithm at a second frequency, wherein the second frequency is based at least in part on the determined current utilization of the one or more processing resources. In some cases, the first frequency and the second frequency are different. In some cases, when processing resources are limited, a video analytics algorithm that has a higher priority may be executed more frequently (e.g. every frame of the captured video) than a video analytics algorithm that has a lower priority (e.g. every ten frame of the captured video). The controller 18 may be configured to send an alert in response to identifying one or more second events in the video stream, as indicated at block 78.

Figure 5:
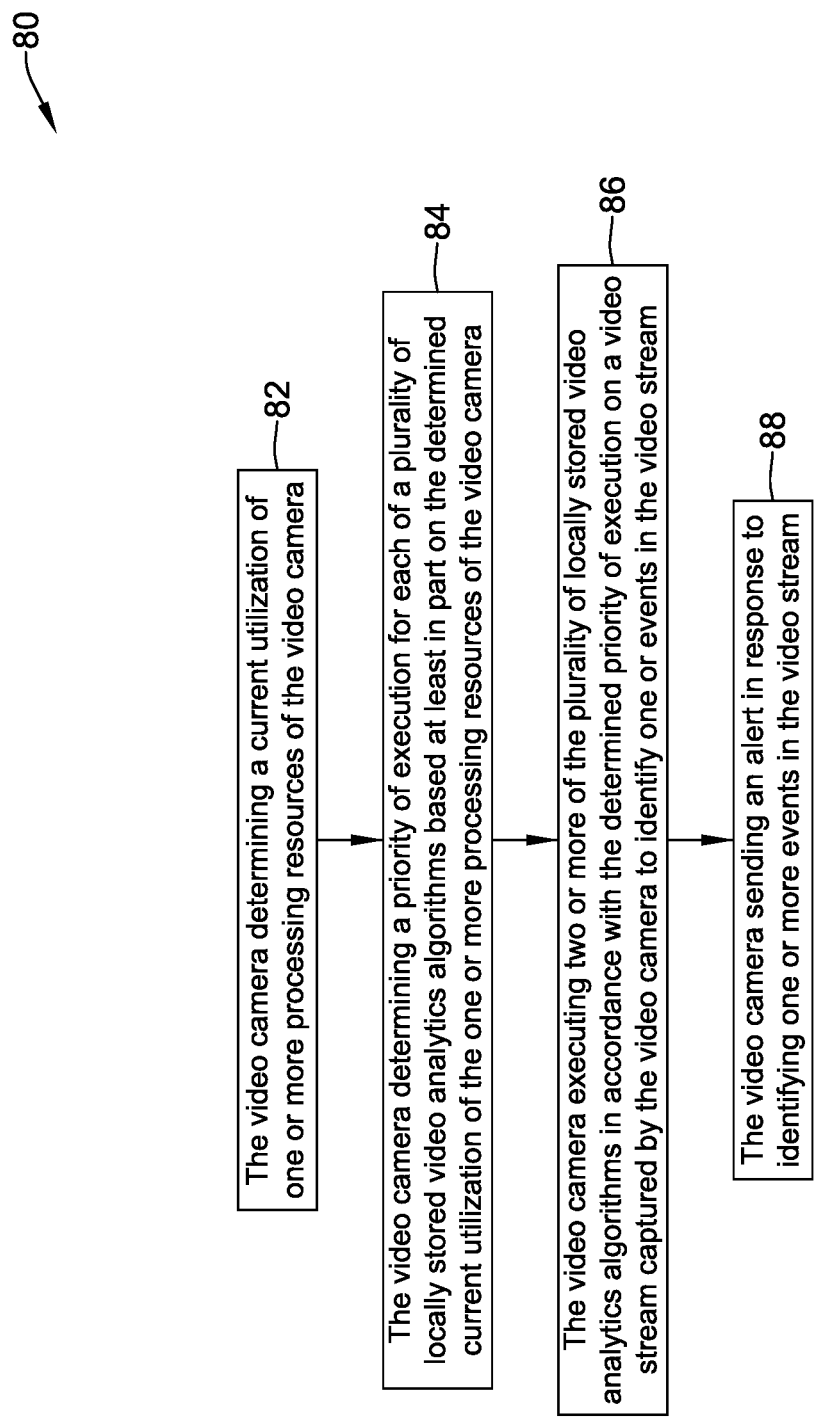
FIG. 5 is a flow diagram showing an illustrative set of steps that a controller forming part of the illustrative video surveillance system of FIG. 1 may be configured to carry out.

FIG. 5 is a flow diagram showing an illustrative method 80 of operating a video camera (such as the video cameras 12). The method 80 includes the video camera determining a current utilization of one or more processing resources of the video camera, as indicated at block 82. The one or more processing resources of the video camera may include one or more of a CPU (central processing unit) utilization, a GPU (graphical processing unit) utilization, and a RAM (random access memory) utilization. The video camera determines a priority of execution for each of a plurality of locally stored video analytics algorithms based at least in part on the determined current utilization of the one or more processing resources of the video camera, as indicated at block 84.

In some cases, the two or more of the plurality of locally stored video analytics algorithms may include two video analytics algorithms that identify different event types in the video stream. The two or more of the plurality of locally stored video analytics algorithms may include two video analytics algorithms that identify a common event type in the video stream, wherein one of the two video analytics algorithms identifies the common event type with more granularity and/or accuracy than the other of the two video analytics algorithms that identify the common event type.

The video camera executes two or more of the plurality of locally stored video analytics algorithms in accordance with the determined priority of execution on a video stream captured by the video camera to identify one or more events in the video stream, as indicated at block 86. The video camera sends an alert in response to identifying one or more events in the video stream, as indicated at block 88.

Figure 6A:
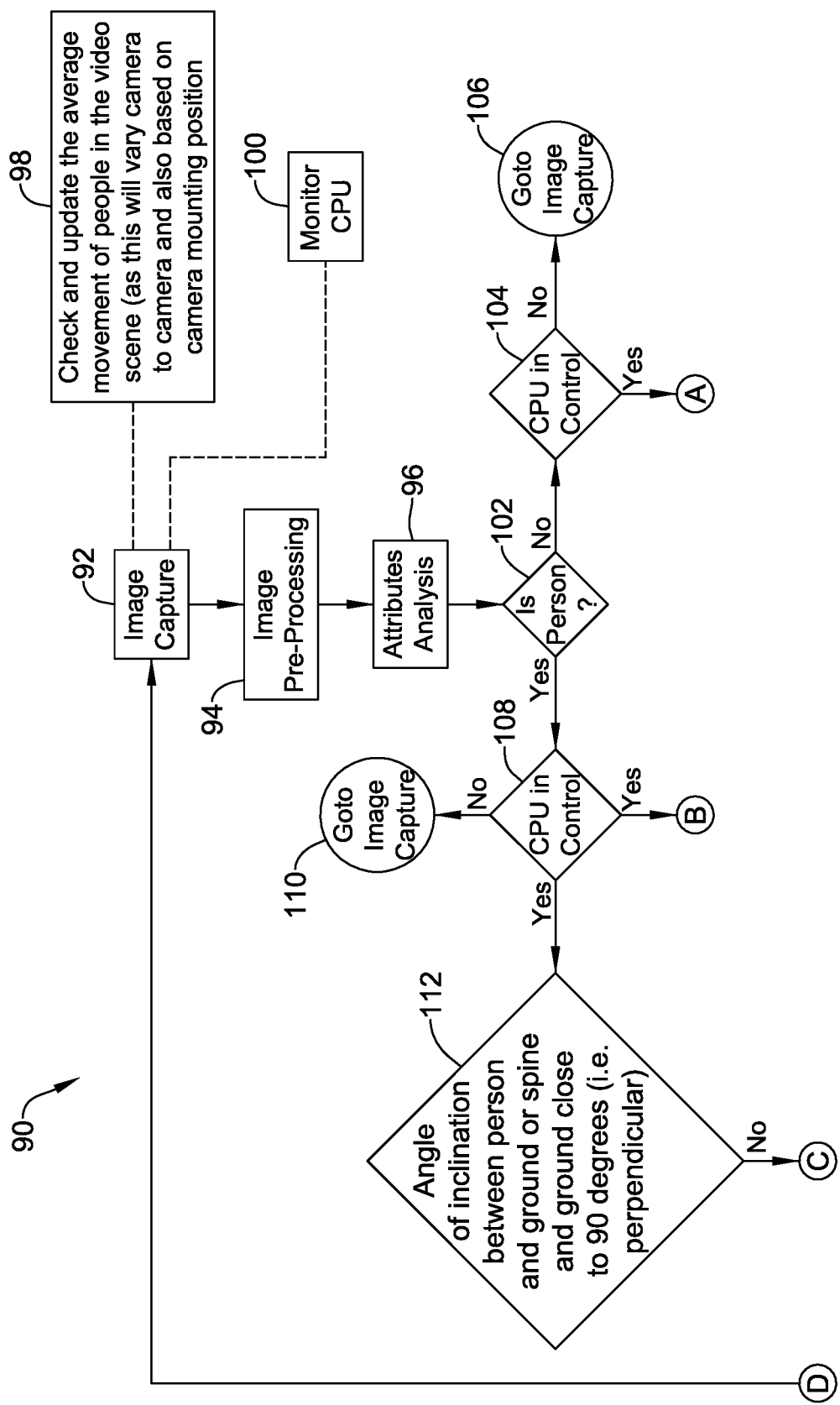

FIGS. 6A and 6B are flow diagrams that together show an illustrative method 90. The illustrative method 90 includes an image capture block 92. The image capture block 92 captures an image using the camera. The image capture block 92 also receives an indication of CPU usage of the video camera from monitor CPU block 100. The image capture block 92 also receives an average movement of people parameter from block 98, which may be used to determine an image capture rate (e.g. Frames-Per-Second (FPS)) of the image capture block 92.

The captured image undergoes pre-processing, as indicated at block 94. In some cases, image pre-processing may include sending frames to a client (external device), but this is not required. An attributes analysis is performed, as indicated at block 96. Referring to decision block 102, a determination is made as to whether the captured image includes a person.

The illustrative method 90 includes an example video analytics algorithm that is tailored to a particular use case, and in this case, the use case of identifying particular safety events in a surveillance area. The video analytics algorithm, or at least part of the video analytics algorithm, is only executed when the "CPU is in control", meaning that the CPU has extra CPU cycles that are not currently being used by the video camera as determined by monitor CPU block 100. If the CPU is currently not in control, meaning that the CPU does not have sufficient extra CPU cycles that are not currently being used by the video camera as determined by monitor CPU block 100, the video analytics algorithm, or at least parts of the video analytics algorithm, is not executed and control is passed back to image capture block 92.

For example, if a person is not detected in decision block 102, control passes to decision block 104 where a determination is made as to whether the CPU is in control, meaning the CPU has extra CPU cycles that are not currently being used by the video camera as determined by monitor CPU block 100. If the CPU is not in control, control passes to block 106, which returns to image capture block 92 and bypasses the video analytics algorithm, or at least part of the video analytics algorithm. If the CPU is in control, control passes to point A, which is continued on FIG. 6B.

Returning to the decision block 102, if the captured image does include a person, control passes to decision block 108, where a determination is made as to whether the CPU is in control. If not, control passes to block 110, which returns to image capture block 92 and bypasses the video analytics algorithm, or at least part of the video analytics algorithm. If the CPU is in control, dual paths are followed. Control passes to point B, which is continued on FIG. 6B. Control also passes to decision block 112, where a determination is made as to the orientation of the person in the captured image. If the captured person is not standing up, or close to it, control passes to point C, which is continued on FIG. 6B.

Moving to FIG. 6B, and continuing from point A, control passes to a decision block 114, where a determination is made as to whether the captured image includes a vehicle. If not, control passes to block 116, where sharp objects and unidentified objects are identified. If sharp objects and/or unidentified objects are identified, control passes to block 118 where a safety event is raised. Referring back to decision block 114, if the captured image did include a vehicle, control passes from decision block 114 to block 120, which involves vehicle speed detection. Control passes to decision block 122, where a determination is made as to whether the vehicle is speeding (e.g. speed exceeds a threshold speed). If so, control passes to block 118 where a safety event is raised.

Continuing from point B, control passes to a decision block 124, where a determination is made as to whether a moving person has been detected. If so, control passes to block 126, and tracking begins. At block 128, the person's velocity is calculated. Control passes to a decision block 130, where a determination is made as to whether the person's velocity is different from an overall average speed in the scene (provided by block 98 of FIG. 6A) by more than a threshold. If not, control passes to block 132, which returns to image capture block 92. If the person's velocity is different from the overall average speed in the scene by more than a threshold, control passes to block 118, where a safety event is raised.

Continuing from point C, control passes to a block 134, where frames are counted to see if the person has remained in the same state for a long period of time (e.g. greater than a time threshold). Control then passes to a decision block 136, where a determination is made as to whether the time is greater than an expected threshold indicating a fall. If not, control passes to point D, which then joins with point D in FIG. 6A and returns to image capture block 92. If so, control passes to block 118, where a safety event is raised.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A video camera comprising:
a camera for capturing a video stream;
a controller operatively coupled to the camera, the controller including processing resources, the controller configured to:
store a priority parameter for each of the plurality of video analytics algorithms,
wherein the priority parameter is one of:
mandatory, wherein video analytics algorithms having a priority parameter of mandatory must be executed;
mandatory with flexibility in frequency, wherein video analytics algorithms having a priority parameter of mandatory with flexibility in frequency must be executed but can be executed at a reduced frequency;
flexible, wherein video analytics algorithms having a priority parameter of flexible need not be run but should be run if sufficient processing resources are currently available;
determine a current utilization of one or more of the processing resources;
determine a priority of execution for each of a plurality of video analytics algorithms based at least in part on the determined current utilization of the one or more processing resources and the respective priority parameter;
execute two or more of the plurality of video analytics algorithms on the video stream to identify one or more events in the video stream, wherein the controller executes the two or more of the plurality of video analytics algorithms in accordance with the determined priority of execution; and
send an alert in response to identifying one or more events in the video stream.

2. The video camera of claim 1, wherein a first one of the plurality of video analytics algorithms has a higher priority than a second one of the plurality of video analytics algorithms, and the priority of execution comprises executing the first one of the plurality of video analytics algorithms more often than the second one of the plurality of video analytics algorithms.

3. The video camera of claim 1, wherein the plurality of video analytics algorithms comprises two video analytics algorithms that identify different event types in the video stream.

4. The video camera of claim 1, wherein the plurality of video analytics algorithms comprises two video analytics algorithms that identify a common event type in the video stream, wherein one of the two video analytics algorithms identifies the common event type with more granularity than the other of the two video analytics algorithms that identify the common event type.

5. The video camera of claim 1, wherein the plurality of video analytics algorithms comprises two video analytics algorithms that identify a common event type in the video stream, wherein one of the two video analytics algorithms identifies the common event type with more accuracy than the other of the two video analytics algorithms that identify the common event type.

6. The video camera of claim 1, wherein the priority parameter for each of the plurality of video analytics algorithms is stored in a user programmable template.

7. The video camera of claim 1, wherein the processing resources of the controller are used to control one or more operations of the controller other than execution of the two or more of the plurality of video analytics algorithms, wherein the one or more other operations including one or more of:

streaming the video stream to an external device;
recording the video stream to a local removable non-volatile memory;
controlling a Pan, Tilt and/or Zoom (PTX) operation of the video camera; and
servicing one or more web requests from one or more Application Programming Interfaces (API) and streaming the video stream to one or more web clients.

8. A video camera comprising:
a camera for capturing a video stream;
a controller operatively coupled to the camera, the controller including processing resources, the controller configured to:
  determine a current utilization of one or more of the processing resources;
  determine a priority of execution for each of a plurality of video analytics algorithms based at least in part on the determined current utilization of the one or more processing resources, wherein a first one of the plurality of video analytics algorithms has a higher priority than a second one of the plurality of video analytics algorithms, and a third one of the plurality of video analytics algorithms is a lighter weight version of the second one of the plurality of video analytics algorithms, and wherein the priority of execution comprises executing the third one of the plurality of video analytics algorithms in place of the second one of the plurality of video analytics algorithms;
  execute two or more of the plurality of video analytics algorithms on the video stream to identify one or more events in the video stream, wherein the controller executes the two or more of the plurality of video analytics algorithms in accordance with the determined priority of execution; and
  send an alert in response to identifying one or more events in the video stream.

9. A video camera comprising:
a camera for capturing a video stream;
a controller operatively coupled to the camera, the controller including processing resources, the controller configured to:
  store two or more versions of a first video analytics algorithm including a heavier weight version of the first video analytics algorithm and a lighter weight version of the first video analytics algorithm;
  determine a current utilization of one or more of the processing resources of the controller;
  select either the heavier weight version of the first video analytics algorithm or the lighter weight version of the first video analytics algorithm based at least in part on the determined current utilization of the one or more processing resources;
  execute the selected version of the first video analytics algorithm to identify one or more first events in the video stream; and
  send an alert in response to identifying one or more first events in the video stream.

10. The video camera of claim 9, wherein the heavier weight version of the first video analytics algorithm consumes more of the processing resources of the controller than the lighter weight version of the first video analytics algorithm.

11. The video camera of claim 9, wherein the controller is further configured to:
  determine an updated current utilization of one or more of the processing resources of the controller after executing the selected version of the first video analytics algorithm;
  select either the heavier weight version of the first video analytics algorithm or the lighter weight version of the first video analytics algorithm based at least in part on the updated current utilization of the one or more processing resources;
  execute the updated selected version of the first video analytics algorithm that is based at least in part on the updated current utilization of the one or more processing resources to identify one or more updated first events in the video stream; and
  send an alert in response to identifying one or more updated first events in the video stream.

12. The video camera of claim 9, wherein the controller is further configured to:
  store two or more versions of a second video analytics algorithm including a heavier weight version of the second video analytics algorithm and a lighter weight version of the second video analytics algorithm;
  select either the heavier weight version of the second video analytics algorithm or the lighter weight version of the second video analytics algorithm based at least in part on the determined current utilization of the one or more processing resources;
  execute the selected version of the second video analytics algorithm to identify one or more second events in the video stream; and
  send an alert in response to identifying one or more second events in the video stream.

13. The video camera of claim 9, wherein the controller is further configured to:
  execute the selected version of the first video analytics algorithm at a first frequency, wherein the first frequency is based at least in part on the determined current utilization of the one or more processing resources.

14. The video camera of claim 13, wherein the controller is further configured to:
  execute a second video analytics algorithm to identify one or more second events in the video stream; and
  send an alert in response to identifying one or more second events in the video stream.

* * * * *